(12) United States Patent
Glad et al.

(10) Patent No.: US 8,372,286 B2
(45) Date of Patent: Feb. 12, 2013

(54) METHOD FOR PRODUCTION OF SEPARATION MEDIA

(75) Inventors: Gunnar Glad, Uppsala (SE); Bo-Lennart Johansson, Uppsala (SE); Jean-Luc Maloisel, Uppsala (SE); Nils Norrman, Uppsala (SE); Ake Stenholm, Uppsala (SE)

(73) Assignee: GE Healthcare Bio-Sciences AB, Uppsala (SE)

( * ) Notice: Subject to any disclaimer, the term of this patent is extended or adjusted under 35 U.S.C. 154(b) by 329 days.

(21) Appl. No.: 12/863,448

(22) PCT Filed: Jan. 30, 2009

(86) PCT No.: PCT/SE2009/000063
§ 371 (c)(1),
(2), (4) Date: Jul. 19, 2010

(87) PCT Pub. No.: WO2009/099375
PCT Pub. Date: Aug. 13, 2009

(65) Prior Publication Data
US 2010/0298548 A1   Nov. 25, 2010

(30) Foreign Application Priority Data
Feb. 5, 2008   (SE) .................................... 0800263

(51) Int. Cl.
*B01D 15/08*   (2006.01)
(52) U.S. Cl. .................. 210/635; 210/656; 210/198.2; 210/502.1; 264/12; 536/124
(58) Field of Classification Search .............. 210/635, 210/656, 198.2, 502.1; 264/5, 12; 536/123.1, 536/124
See application file for complete search history.

(56) References Cited

U.S. PATENT DOCUMENTS

| 5,662,840 A * | 9/1997 | Thomas et al. ............... 264/12 |
| 6,984,733 B2 * | 1/2006 | Berg et al. .................... 536/124 |
| 2003/0052426 A1 * | 3/2003 | Andersson et al. .......... 264/5 |
| 2004/0039193 A1 * | 2/2004 | Berg et al. .................... 536/123 |
| 2006/0025585 A1 * | 2/2006 | Berg et al. .................... 536/124 |
| 2010/0298548 A1 * | 11/2010 | Glad et al. ................... 530/388.1 |

FOREIGN PATENT DOCUMENTS

| WO | WO 88/07414 | 10/1988 |
| WO | WO 97/02125 | * 1/1997 |
| WO | WO 01/40767 | 6/2001 |
| WO | WO 02/12374 | 2/2002 |
| WO | WO 03/091315 | 11/2003 |
| WO | WO 2004/020994 | 3/2004 |
| WO | WO 2006/033634 | 3/2006 |

* cited by examiner

*Primary Examiner* — Ernest G Therkorn

(57) ABSTRACT

The present invention relates to a method for production of separation media using a so called Spinning Disc technology wherein the porosities of the beads are optimized in such a way that a desired biomolecule may be separated from a complex sample. The method comprises the following steps: a) feeding a 4-8% polysaccharide solution, which has a viscosity within 350-450 mPas, at 65-75° C. to one or more spinning discs at 3001-3010 rpm to form polysaccharide beads; b) capturing said formed polysaccharide beads in a capturing bath; wherein the porosity of the polysaccharide beads is controlled by varying the temperature of the capturing between 15 and 27° C., preferably between 17.5 and 24.6° C. The method yields porosities that prevent molecules larger than 150 000 g/mol to diffuse into the beads. The invention also relates to separation media produced by the method and use thereof for purification of biomolecules, in particular monoclonal antibodies.

9 Claims, 2 Drawing Sheets

METHOD FOR PRODUCTION OF SEPARATION MEDIA

CROSS-REFERENCE TO RELATED APPLICATIONS

This application is a filing under 35 U.S.C. §371 and claims priority to international patent application number PCT/SE2009/000063 filed Jan. 30, 2009, published on Aug. 13, 2009, as WO 2009/099375, which claims priority to patent application number 0800263-6 filed in Sweden on Feb. 5, 2008.

FIELD OF THE INVENTION

The present invention is within the field of chromatography. More precisely, it relates to a method for production of separation media using a so called Spinning Disc technology wherein the porosity of the beads may be selected in such a way that a desired biomolecule may be separated from a complex sample.

BACKGROUND OF THE INVENTION

Within biotechnology, one of the most widely used separation methods is chromatography. The term chromatography embraces a family of closely related separation methods. The feature distinguishing chromatography from most other physical and chemical methods of separation is that two mutually immiscible phases are brought into contact wherein one phase is stationary and the other mobile. The sample mixture, introduced into the mobile phase, undergoes a series of interactions i.e. partitions between the stationary and mobile phases as it is being carried through the system by the mobile phase. Interactions exploit differences in the physical or chemical properties of the components in the sample. These differences govern the rate of migration of the individual components under the influence of a mobile phase moving through a column containing the stationary phase. Separated components emerge in a certain order, depending on their interaction with the stationary phase. The least retarded component elutes first, the most strongly retained material elutes last. Separation is obtained when one component is retarded sufficiently to prevent overlap with the zone of an adjacent solute as sample components elute from the column.

The chromatographic methods suggested up to date are based on different modes of interaction with a target. Thus, for example, in ion-exchange chromatography, the functional groups are permanently bonded ionic groups with their counter ions of opposite charge, while in hydrophobic interaction chromatography (HIC), the interaction between the stationary phase and the component to be separated is based on hydrophobicity. Other chromatographic separation principles are well known to the skilled person in the art.

The stationary phase, also known as the separation matrix, comprises a support, which is commonly a plurality of essentially spherical particles, and ligands coupled to the support. In most separation matrices, the support is porous to allow a larger amount of ligand and consequently more bound target compound in each particle. The support is most often a natural or synthetic polymer and the spherical particles may be produced in a number of different ways. Natural polymers often used for this purpose are the polysaccharides dextran and agarose.

The Spinning Disc technology may be used to form agarose beads. It comprises a rotating disc to which liquids are fed on the centre under suitable conditions and centrifuged off the edge. The disc-edge is toothed in order to create droplets. By use of this technology, droplets of uniform size are created at the edge of the disc. The use of Spinning Disc technology for producing sprays, mists and oils of uniform drop size is an established technique. Walter and Prewett (Walton, W. H.; Prewett, W. C. (1949) *Proc. Phys. Soc. B*. 62, 341-350) concluded as early as 1949 that the size of spray drops is given approximately by the equation (1)

$$d = \frac{3.8(T/D\rho)^{1/2}}{\omega} \qquad (1)$$

wherein
d=drop diameter, D=disc diameter, ω=angular velocity of disc, T=surface tension of liquid, and ρ=density of liquid.

For separation of biomolecules, by chromatographic and batch-wise procedures, the porosity of the beads is very important. One advantage of polymeric media is the opportunity of pore size variation over broad ranges. A general rule, which is accepted to throughout the literature, is to use media with large pore sizes for large molecules. Mass transfer in these pores is a result of diffusion processes and not of convection. It would be desirable to obtain a porosity with a narrow pore size distribution to obtain a selective medium. In the manufacturing of agarose beads using the Spinning Disc technology, it would be desirable to use a procedure by which the bead porosity could be optimized to exclude molecules exceeding a certain chosen size, for example monoclonal antibodies.

SUMMARY OF THE INVENTION

The present invention provides a method aimed for controlling the porosity of Spinning Disc media, which maximizes the bead interaction for small molecules penetrating the beads and minimizes the bead interaction for larger molecules not penetrating the beads. The media are preferably based on agarose and the production process of Spinning Disc media is optimized to obtain beads with a porosity that excludes large proteins, such as monoclonal antibodies.

Humanized monoclonal antibodies (mAbs) hold significant promise as biopharmaceuticals. One most important challenge faced in the purification of mAbs is their separation from host cell proteins (HCPs) in the cell culture media. The present invention enables the separation of pure mAbs from unwanted HCPs.

Preferably, the Spinning Disc media is further processed to a so called lid media, i.e. the beads obtained from the Spinning Disc procedure constitute the core of the beads and a lid or outer layer of another composition than the core covers the core.

In a first aspect, the invention provides a method for selective production of polymer beads in a Spinning Disc procedure, wherein the beads have a porosity that prevents molecules larger than 150 000 g/mol to diffuse into the beads, comprising the following steps:
a) feeding a 4-8% polysaccharide solution, which has a viscosity within 350-450 mPas, at 65-75° C. to one or more spinning discs at 3001-3010 rpm to form polysaccharide beads;
b) capturing said formed polysaccharide beads in a capturing bath; wherein the porosity of the polysaccharide beads is controlled by varying the temperature of the capturing between 15 and 27° C., preferably between 17.5 and 24.6° C.

The above parameters are essential for controlling the porosity of the beads to the desired limit, i.e. a limit that provides molecules larger than 150 000 g/mol, such as monoclonal antibodies, to diffuse into the beads.

The polysaccharide beads are preferably selected from agarose, carrageenan, dextran, alginate, pectin, starch and galactomannans. Such polysaccharides are known to form physically cross-linked networks spontaneously on cooling.

Preferably, the polysaccharide beads comprise agarose and the agarose solution in step a) is a 4-8%, preferably a 6% agarose solution at 65-75° C., preferably approximately 70° C., with a viscosity within 350-450 mPas, preferably 397-421 mPas.

For purification of monoclonal antibodies, a porosity is selected that prevents molecules larger than 150 000 g/mol to diffuse into the beads.

Preferably, the feeding of said polysaccharide solution in step a) to said one or more Spinning Discs is at a flow rate of 120-170 mL/min In a preferred embodiment, the polysaccharide solution is activated, such as activated by CNBr, N-hydroxy-succinimide esters, divinylsulfone, epoxy activation (for example allylation and bromination, as described in the examples below) or by any other activation method known to the skilled person in the art.

The polysaccharide beads may be cross-linked after step b) to obtain more rigid beads.

Preferably, the polysaccharide beads are provided with lids or outer layers after step b). In a preferred embodiment the polysaccharide beads are allylated and partially brominated and NaOH treated to form a lid on the core polysaccharide beads.

Preferably, the core polysaccharide beads are provided with ligands, but the lid is not provided with any ligands. The lid prevents the larger molecules from reacting with the ligands on the core polysaccharide beads. This is an advantage in that the mobile phase can be chosen to optimize the interaction between unwanted proteins and the core ligands, and in that there is not risk that the wanted proteins are captured by the core ligands. Thus, any mobile phase may be selected for chromatographic separation or any supernatant for batch-wise separation. For example, the interaction between the ligand and IgG (monoclonal antibodies) can be totally eliminated. This is a different approach than prior art wherein it is desired to capture the large molecules within the pores. It was surprising that the present inventors could find a porosity that excludes non-wanted from wanted molecules in a very precise way, i.e. no overlap of wanted molecules inside the beads or un-wanted molecules in the flow through or supernatant.

Any type of ligand may be coupled to the core of the beads, such as anion exchange, cation exchange, affinity, hydrophobic interaction or any combination thereof. The ligands may optionally be provided with extenders.

Preferably, the ligands are ion exchange ligands.

In a preferred embodiment, the ion exchange ligands are weak anion exchange ligands provided with extenders, to increase the distance from the polysaccharide beads and the ligands and to improve accessibility to the ligands as well as to increase ligand density.

In a second aspect, the invention provides separation media produced according to the above method, wherein the ligand is an ion exchanger. Preferably, a weak anion exchanger provided with and extender.

In a preferred embodiment, the polysaccharide is agarose and the weak anion exchanger is DEAE and the extender is dextran.

In a third aspect, the invention relates to the use of the separation media according to invention for chromatographic or batch-wise separation of desired biomolecules from undesired biomolecules.

In one embodiment, undesired molecules diffuse into the beads while the desired molecules do not. In this case the desired biomolecule may be IgG or monoclonal antibodies or other large and desired biomolecules, such as virus or plasmids.

The invention is not restricted to bioprocess applications, such as purification of monoclonal antibodies, but may also be used for sample preparation, for example proteomic analysis of body fluids.

In an alternative embodiment, the desired molecules diffuse into the beads while the undesired do not. In this case the desired molecules are low abundant proteins with molecular weights<60 000 g/mol, such as biomarkers. The low abundant proteins are then further purified on for example 2D electrophoresis and preferably analysed using LC-MS.

DETAILED DESCRIPTION OF THE INVENTION

In the formation of agarose beads using Spinning Disc technology, the rotating speed is an important variable for achieving beads with certain sizes. While the cross-linked beads are aimed to be used for separation purposes, the gelation mechanisms of the beads are of interest, since the final gel structure defines the porosity. It is well known that a fast cooling rate of an agarose solution will lead to a phase separation before any appreciable amounts of ordered aggregates are formed resulting in a poor porosity. The pore size in a bead is also dependent on the used concentration of the agarose solution. The pore size increases as the concentration is decreased.

EXAMPLES

The present examples are provided for illustrative purposes only, and should not be construed as limiting the scope of the present invention as defined by the appended claims. All references given below and elsewhere in the present specification are hereby included herein by reference.

Example 1

Preparation of Spinning Disc Media

Figure 1:
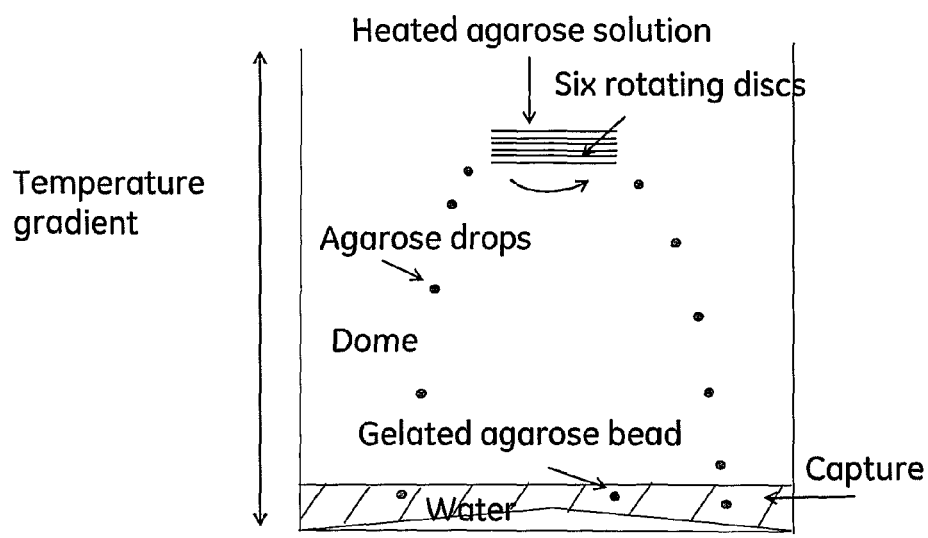
FIG. 1 is a schematic drawing illustrating agarose bead formation using Spinning Disc technology. Dome=closed space surrounding the falling drops. Capture=water filled basin in which the gelation occurs.

6% agarose solutions were used as starting material. Temperature, cooling rate, viscosity, speed and agarose flow rate (to the disc) were investigated with respect to the porosity response. A schematic picture of the Spinning Disc procedure is depicted in FIG. 1 (prior art).

Experimental

The Spinning Disc apparatus was manufactured by ABB Industriservice according to given specification (see below):

Steel quality: SS 2343-02 (for all specified items)
Polymeric materials: PTFE, polycarbonate (dome protection), EPDM (Ethylene Propylene Diene Monomer), silicon rubber.
Dome height: 900 mm
Capture basin diameter: 2400 mm including water drain channel
Capture basin slope: 3°
Number of discs: 6
Disc diameter: 200 mm
General disc thickness: maximum 5.2 mm
Disc thickness at edges: 12.4 mm including 135° slope
Upper pressure compensation chamber diameter (for liquid agarose solution): 73 mm
Upper pressure compensation chamber height: 6 mm
Number of distribution needles: 6
Inner diameter of needles: 0.7 mm The agarose solution was fed to six discs via needles. By using six discs instead of one, there is an increase in capacity. The agarose flow was the same to each of the six discs. This means that the bead size originating from each disc is the same. The speed range of the discs was adjusted within 3001-3010 rpm and the relative humidity in the dome was 100%. If the relative humidity is less than 100% there is a risk that water will be evaporated from the agarose drops.

Allylated, 6% agarose solutions adjusted to 69.7° C. with viscosities within 397-421 mPas were used to feed the spinning discs. The flow rates of the agarose solutions to the discs were adjusted between 120-170 mL/min The capture water temperatures were between 17.5 and 24.6° C.

Five prototypes were produced and the porosities of the beads after cross-linking with epichlorohydrin are presented in Table 1. The porosities of the prototypes were estimated with different dextrans and the void volumes were obtained using blue dextran 2000. The Spinning Disc prototypes were produced to obtain porosities that not allow immunoglobulins to penetrate the beads. This means that molecules with molecular weights exceeding approximately 150 000 g/mol should not diffuse into the beads.

TABLE 1

The $K_{av}$-value of five different dextran standards for different Spinning Disc prototypes (A-E).

| | $K_{av}$- value[1] | | | | |
|---|---|---|---|---|---|
| Mw Dx | A | B | C | D | E |
| 9890 | 0.655 | 0.645 | 0.655 | 0.638 | 0.666 |
| 43500 | 0.382 | 0.345 | 0.381 | 0.359 | 0.396 |
| 66700 | 0.276 | 0.241 | 0.284 | 0.256 | 0.292 |
| 123600 | 0.021 | 0.01 | 0.014 | 0.01 | 0.011 |
| 196300 | 0.013 | 0.007 | 0.009 | 0.009 | 0.007 |

[1]The $K_{av}$-value vas calculated as: $(V_R - V_O)/(V_C - V_O)$ where $V_R$ = retention volume of dextran standards, $V_O$ = void volume and $V_C$ = geometric volume of the column.

The particle size of choice for all five prototypes was 190 μm±5 μm. Three of the prototypes (A, D and E) in Table 1 were used to produce media for capture of proteins with a molecular weight less than approximately 70 000 g/mol while larger molecules such as immunoglobulins (human IgG) should not be able to diffuse into the beads and interact with the ligands in the core of the beads.

Example 2

Preparation of Strong Anion Exchange Media Based on Spinning Disc Beads Designed for Capture of Host Cell Proteins Volumes of matrix refer to settled bed volume. Weights of matrix given in gram refer to suction dry weight. It is understood that these matrices are still water solvated material. For large scale applications, reaction stirring is referring to a suspended, motor-driven stirrer since the use of magnet bar stirrer is prompt to damage the beads. Small-scale reactions (up to 20 mL or g of gel) were performed in closed vials and stirring refers to the use of a shaking table.

Figure 2:
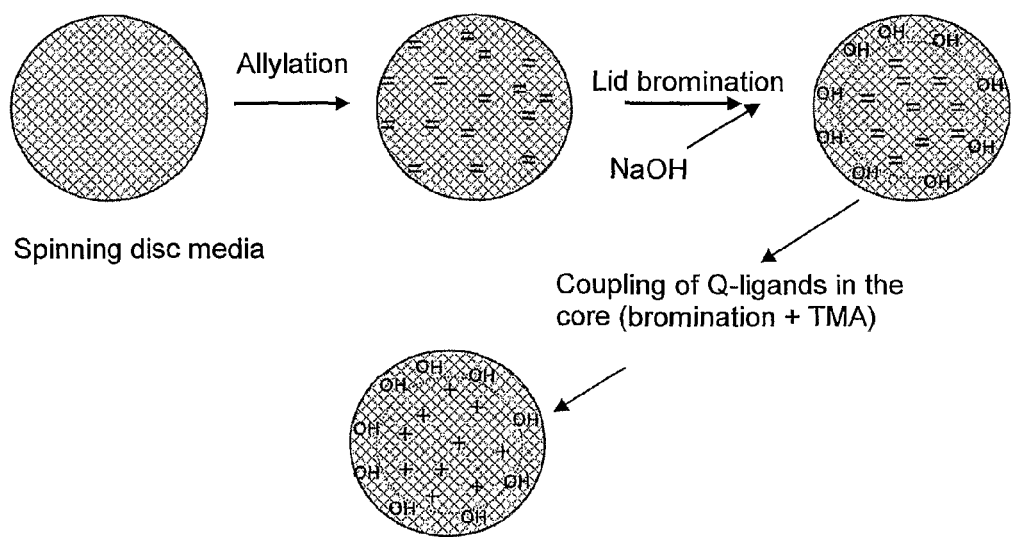
FIG. 2 is an illustration of the activation and ligand (TMA=—$N^+(CH_3)_3$) coupling procedure for Spinning Disc beads (prototypes Q1, Q2 and Q3, see below).

Conventional methods were used for the analysis of the functionality and the determination of the degree of allylation, epoxidation, or the degree of substitution of ion exchanger groups on the beads. In FIG. 2, the general synthetic procedure depicted for creation of a OH-lid and attachment of positively charged ligands (=—$N^+(CH_3)_3$) in the core of the beads is presented.

A. Preparation of Prototype Q1 (See FIG. 2) Based on Spinning Disc Prototype A Preparation of an OH-Lid-Allyl Gel Allyl activation of Spinning Disc prototype A. Spinning Disc prototype A was washed with distilled water on a glass filter. The gel, 25 mL, was drained on the filter and weighed into a 3-necked round bottomed flask. NaOH (12.5 mL, 50%-solution) was added and mechanical stirring started. Sodium borohydride, 0.1 g, and sodium sulphate, 2.9 g, were added to the flask and the slurry heated to 50° C. on a water bath. After approximately one hour 27.5 mL of AGE was added. The slurry was then left under vigorous stirring over night. After about 20 hours the slurry was transferred to a glass filter and the pH adjusted to around 7 with acetic acid (60%). The gel was then washed with distilled water (×4), ethanol (×4) and distilled water (×4). The allyl content was then determined by titration; 262 μmol/mL.

Partial bromination and NaOH treatment. Allylated gel, 22 mL, was weighed into a flask and 80 mL of distilled water and 1 g sodium sulphate was added. 0.3 equivalents of bromine, 89 μL, were then added with a pipette during vigorous stiffing. After approximately 5 minutes (when the bromine was consumed) the gel was washed with distilled water on a glass filter.

The partially brominated gel was transferred to a flask with water. NaOH (50%-solution) was then added to pH>13 and the slurry were heated to 50° C. and left under stirring over night. After approximately 18 hours, the pH was adjusted to approximately 7 with acetic acid (60% solution). The gel was then washed with distilled water on a glass filter.

The remaining allyl content was then determined by titration; 200 μmol/mL.

Attachment of Q-Groups to the Core of the Beads

Q-coupling (trimethyl ammonium chloride). 10 mL of drained gel (the partial brominated and NaOH treated gel) was mixed with distilled water into a beaker and vigorous overhead stirring was begun. Bromine was added until the slurry had a remaining deeply orange/yellow colour. After 10 minutes of stirring, sodium formiate (approximately 1.5 g) was added until the slurry was completely discoloured. The gel was then washed with distilled water on a glass filter.

Drained brominated gel was weighed into a flask and 5 mL of trimethyl ammonium chloride (TMA-chloride, 65% aqueous solution) and 5 mL of 2 M NaOH was added. The pH was then adjusted to approximately 12.5 with NaOH (50%-solution). The mixture was then left stirring in 50° C. over night. After 20 hours, the gel was washed with distilled water and the chloride capacity of prototype Q1 was determined by titration, 160 μmol/mL.

B. Preparation of Prototypes Q2 and Q3 Based on Spinning Disc Prototype E and D, Respectively
Preparation of OH-Lid-Allyl Gel Based on Spinning Disc Prototype E and D Allyl activation of Spinning Disc prototype E. Spinning Disc prototype E was washed with distilled water on a glass filter. The gel, 100 mL, was drained on the filter and weighed into a 3-necked round bottomed flask. NaOH (50 mL, 50%-solution) was added and mechanical stirring started. Sodium borohydride, 0.4 g, and sodium sulphate, 11.4 g, were added to the flask and the slurry heated to 50° C. on a water bath. After approximately one hour 110 mL of AGE was added. The slurry was then left under vigorous stirring over night. After approximately 20 hours, the slurry was transferred to a glass filter and the pH adjusted to around 7 with acetic acid (60%). The gel was then washed with distilled water (×4), ethanol (×4) and distilled water (×4). The allyl content was then determined by titration; 292 μmol/mL.

Partial bromination and NaOH treatment of allylated Spinning Disc prototype E. Allylated gel, 60 mL, was weighed into a flask and 300 mL of distilled water and 5 g sodium sulphate was added. 0.3 equivalents of bromine, 269 μL, were then added with a pipette during vigorous stirring. After approximately 5 minutes (when the bromine was consumed) the gel was washed with distilled water on a glass filter.

The partially brominated gel was transferred to a flask with water solution. NaOH (50%-solution) was then added to pH>13 and the slurry was heated to 50° C. and left stirring over night. After approximately 18 hours the pH was adjusted to approximately 7 with acetic acid (60% solution). The gel was then washed with distilled water on a glass filter. The remaining allyl content was then determined by titration; 245 μmol/mL.

Allyl activation of Spinning Disc prototype D. Spinning Disc prototype D was washed with distilled water on a glass filter. The gel, 50 mL, was drained on the filter and weighed into a 3-necked round bottomed flask. NaOH (25 mL, 50%-solution) was added and mechanical stirring started. Sodium borohydride, 0.2 g, and sodium sulphate, 5.7 g, were added to the flask and the slurry heated to 50° C. on a water bath. After approximately one hour 55 mL of AGE was added. The slurry was then left under vigorous stirring over night. After approximately 20 hours, the slurry was transferred to a glass filter and the pH adjusted to around 7 with acetic acid (60%). The gel was then washed with distilled water (×4), ethanol (×4) and distilled water (×4). The allyl content was then determined by titration; 330 μmol/mL.

Partial bromination and NaOH treatment of allylated Spinning Disc prototype D. Allylated gel, 10 mL, was weighed into a flask and 90 mL of distilled water and 1 g sodium sulphate was added. 0.3 equivalents of bromine, 51 μL, were then added with a pipette during vigorous stirring. After approximately 5 minutes (when the bromine was consumed) the gel was washed with distilled water on a glass filter.

The partially brominated gel was transferred to a flask with water. NaOH (50%-solution) was then added to pH>13 and the slurry was heated to 50° C. and left stirring over night. After approximately 18 hours the pH was adjusted to approximately 7 with acetic acid (60% solution). The gel was then washed with distilled water on a glass filter.

The remaining allyl content was then determined by titration; 277 μmol/mL.

Attachment of Q-Groups to the Core of the Beads
Q-coupling of Spinning Disc prototype D (prototype Q2). 10 mL of drained gel (the partial brominated and NaOH treated Spinning Disc prototype D) was mixed with distilled water into a beaker and vigorous overhead stirring took place. Bromine was added until the slurry exhibited a persistent deeply orange/yellow colour. After 10 minutes of stirring, sodium formiate (approximately 1.5 g) was added until the slurry was completely discoloured. The gel was then washed with distilled water on a glass filter. Drained brominated gel was weighed into a flask and 5 mL of trimethyl ammonium chloride (TMA-chloride, 65% aqueous solution) and 5 mL of 2 M NaOH was added. The pH was then adjusted to approximately 12.5 with NaOH (50%-solution). The mixture was then left stirring in 50° C. over night. After 20 hours the gel was washed with distilled water and the chloride capacity of the gel was determined by titration; 172 μmol/mL.

Q-coupling of Spinning Disc prototype E (prototype Q3). 10 mL of drained gel (the partially brominated and NaOH treated Spinning Disc prototype E) was mixed with distilled water into a beaker and vigorous overhead stirring took place. Bromine was added until the slurry exhibited a persistent deeply orange/yellow colour. After 10 minutes of stirring, sodium formiate (approximately 1.5 g) was added until the slurry was completely discoloured. The gel was then washed with distilled water on a glass filter. Drained brominated gel was weighed into a flask and 5 mL of trimethyl ammonium chloride (TMA-chloride, 65% aqueous solution) and 5 mL of 2 M NaOH was added. The pH was then adjusted to approximately 12.5 with NaOH (50%-solution). The mixture was then left stirring in 50° C. over night. After 20 hours, the gel was washed with distilled water and the chloride capacity of the gel was determined by titration; 182 μmol/mL.

Example 3

Preparation of Three Weak Anion Exchange Media (Prototypes DEAE I-III) Based on Spinning Disc Prototype E Preparation of OH-Lid-Allyl Gel Based on SPINNING Disc Prototype E Allyl activation of Spinning Disc prototype E. Spinning Disc prototype E was washed with distilled water on a glass filter. The gel, 100 mL, was drained on the filter and weighed into a 3-necked round bottomed flask. NaOH (50 mL, 50%-solution) was added and mechanical stirring started. Sodium borohydride, 0.4 g, and sodium sulphate, 11.4 g, were added to the flask and the slurry heated to 50° C. on a water bath. After approximately one hour, 110 mL of AGE was added. The slurry was then left under vigorous stirring over night. After approximately 20 hours, the slurry was transferred to a glass filter and the pH adjusted to around 7 with acetic acid (60%). The gel was then washed with distilled water (×4), ethanol (×4) and distilled water (×4). The allyl content was then determined by titration; 292 μmol/mL.

Partial bromination and NAOH treatment of allylated Spinning Disc prototype E. Allylated gel, 60 mL, was weighed into a flask and 300 mL of distilled water and 5 g sodium sulphate was added. 0.3 equivalents of bromine, 269 μL, were then added with a pipette during vigorous stirring. After approximately 5 minutes (when the bromine was consumed) the gel was washed with distilled water on a glass filter.

The partially brominated gel was transferred to a flask with water solution. NaOH (50%-solution) was then added to pH>13 and the slurry was heated to 50° C. and left under stirring over night. After approximately 18 hours, the pH was adjusted to approximately 7 with acetic acid (60% solution). The gel was then washed with distilled water on a glass filter.

The remaining allyl content was then determined by titration; 245 µmol/mL.

Attachment of DEAE Dextran to the Core of the Beads—Prototypes DEAE I-III 15 mL of drained gel (the partially brominated and NaOH treated Spinning Disc prototype E) was mixed with distilled water into a beaker and vigorous overhead stirring took place. Bromine was added until the slurry exhibited a persistent deeply orange/yellow colour. After 10 minutes of stirring, sodium formiate (approximately 1.5 g) was added until the slurry was completely discoloured. The gel was then washed with distilled water on a glass filter.

5 mL portions of the drained brominated gel were mixed with DEAE Dextran solution (15 g DEAE Dextran dissolved in 25 mL of water, total volume; 37 mL) according to the scheme below and stirred for 0.5 h at room temperature, followed by addition of 0.6 mL of 50% NaOH and 0.1 g NaBH$_4$, and stiffing at 50° C. for 17 h. After washing with water, 0.5 M HCl and 1 mM HCl, Cl$^-$ capacities were determined by titration (see Table 4).

Prototype DEAE-I: 1 mL DEAE Dextran solution+9 mL of water
Prototype DEAE-II: 4 mL DEAE Dextran solution+6 mL of water
Prototype DEAE-III: 10 mL DEAE Dextran solution Example 4

Preparation of Weak Cation Exchanger (Prototype COO$^-$) Based on Spinning Disc Prototype A Preparation of OH-Lid-Allyl Gel Based on Spinning Disc Prototype A Allyl activation of Spinning Disc prototype A. Spinning Disc prototype A was washed with distilled water on a glass filter. The gel, 25 mL, was drained on the filter and weighed into a 3-necked round bottomed flask. NaOH (12.5 mL, 50%-solution) was added and mechanical stirring started. Sodium borohydride, 0.1 g, and sodium sulphate, 2.9 g, were added to the flask and the slurry heated to 50° C. on a water bath. After an equilibration time of one hour 27.5 mL of AGE was added. The slurry was then left under vigorously stiffing over night. After approximately 20 hours, the slurry was transferred to a glass filter and the pH adjusted to around 7 with acetic acid (60%). The gel was then washed with distilled water (×4), ethanol (×4) and distilled water (×4). The allyl content was then determined by titration; 262 µmol/mL.

Partial bromination and NAOH treatment of allylated Spinning Disc prototype A. Allylated gel, 22 mL, was weighed into a flask and 80 mL of distilled water and 1 g sodium sulphate was added. 0.3 equivalents of bromine, 89 µL, were then added with a pipette during vigorous stirring. After approximately 5 minutes (when the bromine had been consumed) the gel was washed with distilled water on a glass filter. The partially brominated gel was transferred to a flask with water. NaOH (50%-solution) was then added to pH>13 and the slurry was heated to 50° C. and left stirring over night. After approximately 18 hours the pH was adjusted to approximately 7 with acetic acid (60% solution). The gel was then washed with distilled water on a glass filter.

The remaining allyl content was then determined by titration; 200 µmol/mL.

Attachment of the Ligand to the Core of the Beads

Coupling of N-benzoyl-DL-homocysteine. 10 mL of drained gel (the partially brominated and NaOH treated Spinning Disc prototype A) was mixed with distilled water into a beaker and vigorous overhead stirring took place. Bromine was added until the slurry exhibited a persistent deeply orange/yellow colour. After 10 minutes of stirring, sodium formiate (approximately 1.5 g) was added until the slurry was completely discoloured. The gel was then washed with distilled water on a glass filter.

N-benzoyl-DL-homocysteine thiolactone (3.64 g, 16.47 mmol) was weighed into a round bottomed flask and NaOH (6 mL, 50% solution) and distilled water (40 mL) was added during stirring. The solution was then heated to 40° C. and was left stirring for 3 hours. Drained brominated gel was then transferred to the solution (the pH of the mixture was measured to 12.9) and the temperature was raised to 50° C. After approximately 22 hours the gel was washed with distilled water on a glass filter (4×100 mL). The ionic capacity of the medium (see structure of the core ligand below), was titrated; 184 µmol/mL.

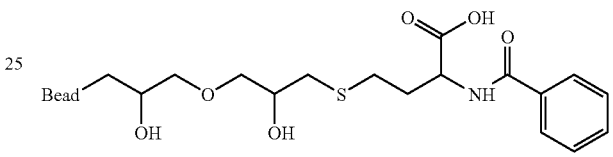

Purification of Monoclonal Antibodies Based on Spinning Disc Media Designed for Capture of Host Cell Proteins A synthetic procedure for attachment of Q-groups (—N$^+$(CH$_3$)$_3$) is illustrated in FIG. 2.

The primary goal with the test procedure was to verify that proteins with a molecular weight less than ca 70 000 g/mol were able to diffuse into the core of the beads while IgG was not able to diffuse into the beads at chromatographic conditions. Therefore, the breakthrough capacities of the Spinning Disc prototypes were tested with proteins of different sizes. Four different test proteins (IgG, BSA, ovalbumin and lactalbumin) were used.

Experimental

The media to be investigated, with respect to breakthrough capacity, were packed in HR 5/5 columns and the sample solution was pumped at a flow rate of 0.3 mL/min through the column after equilibration with buffer solution. The breakthrough capacity was evaluated at 10% of the maximum UV detector signal (280 nm). The maximum UV signal was estimated by pumping the test solution directly into the detector. The breakthrough capacity at 10% of absorbance maximum ($Q_{b10\%}$) was calculated according to the formula:

$$Q_{b10\%} = (T_{R10\%} - T_{RD}) \times C / V_c$$

where $T_{R10\%}$ is the retention time (min) at 10% of absorbance maximum, $T_{RD}$ the void volume time in the system (min), C the concentration of the sample (4 mg protein/mL) and $V_c$ the column volume (mL).

Two different adsorption buffers were used depending on the ligand coupled in the core of the beads:
1. Adsorption buffer for anion exchangers: 25 mM TRIS (pH 8.0)
2. Adsorption buffer for the cation exchanger: 50 mM acetate (pH 4.0) plus addition of 0.15 M NaCl.

Sample

The samples used were human immunoglobulin (IgG, Gammanorm), bovine serum albumin (BSA), ovalbumin and lactalbumin The proteins were dissolved in the adsorption buffers at a concentration of 4 mg/mL and only one protein at a time was applied into the column.

Instrumental

| Apparatus | |
|---|---|
| LC System: | ÄKTAEXPLORER™ 10XT or equal |
| Software: | UNICORN™ |
| Column: | HR 5/5 |

| Instrument parameters | |
|---|---|
| Flow rate: | 0.3 mL/min |
| Detector cell: | 10 mm |
| Wavelength: | 280 nm |

UNICORN™ method

The main method used is depicted below:
0.00 Base CV 1.00 {mL} #Column volume {mL} Any
0.00 Block Start conditions
   0.00 Base SameAsMain
   0.00 Wave length 280 {nm} 254 {nm} 215 {nm}
   0.00 Averaging Time 2.56 {sec}
   0.00 Alarm Pressure Enable 3.00 {MPa} 0.00 {MPa}
   0.00 End Block
0.00 Block Column position
0.00 Block Equilibration
   0.00 Base SameAsMain
   0.00 PumpAInlet A1
   0.00 BufferValveA1 A11
   0.00 Flow 0.3 {mL/min}
   1.00 Set Mark ( ) #column name
   3.9 AutoZeroUV
   5.0 #Equilibration volume End Block
0.00 Block Sample loading
   0.00 Base volume
   0.00 Flow (1) #flow rate {mL/min}
   0.00 Set Mark ( ) #sample
   0.00 InjectionValve Inject
   0.00 Watch UV Greater Than (100) #20 percent maxabs {mAu} END BLOCK
   49.00 InjectionValve Load
   49.00 End Block
0.00 Block Column wash
   0.00 Base SameAsMain
   0.00 InjectionValve Load
   0.00 Watch Off UV
   0.00 PumpAInlet A1
   0.00 BufferValveA1 A11
   0.00 Watch UV Less Than (20) #5 percent {mAu} END BLOCK
   20.00 End Block
0.00 Block Gradient elution.
   0.00 Base SameAsMain
   0.00 PumpBInlet B1
   0.00 Gradient 100 {% B} 2.00 {base}
   0.00 Flow 0.30 {mL/min}
   10.00 Gradient 0.00 {% B} 0.00 {base}
   10.00 End Block
0 Block Reequilibration
   0.00 End Method Example 5

Breakthrough Capacity for Strong Anion Exchange Prototypes

One prototype (Q1) based on Spinning Disc prototype A (Table 1) and with Q-groups in the core of the beads was produced according to FIG. 2. The breakthrough capacities for four proteins were tested and the results are presented in Table 2. The capacities were low for the two largest proteins IgG and BSA (<2 mg/mL) and the capacities for ovalbumin and lactalbumin were 68 and 89 mg/mL, respectively.

TABLE 2

Figure 3:
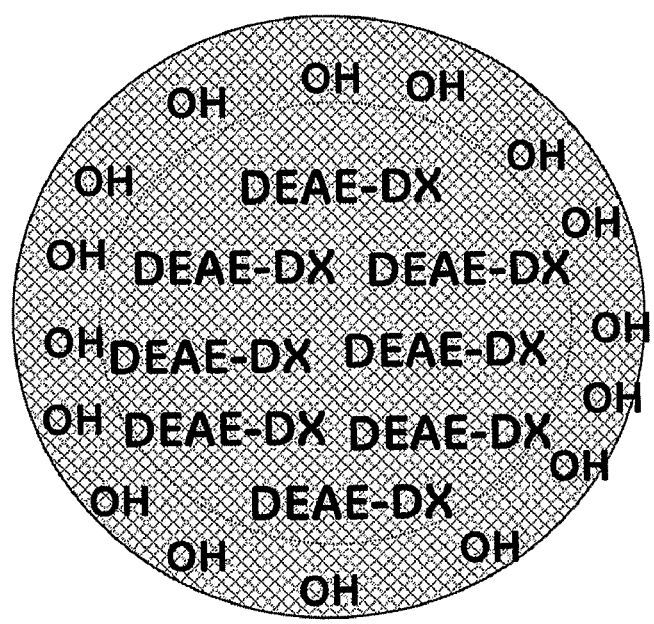
FIG. 3 is an illustrative picture of prototypes substituted with DEAE-dextran (DEAE-DX) in the core of the beads.

Breakthrough capacities for four proteins on an anion exchange prototype (prototype Q1) design as depicted in FIG. 3 and based on Spinning Disc prototype A

| Protein | Molecular weight (g/mol) | Breakthrough capacity (mg/mL) |
|---|---|---|
| IgG | 150 000 | 1.6 |
| BSA | 68 000 | 1.9 |
| Ovalbumin | 43500 | 68.0 |
| Lactalbumin | 14400 | 89.7 |

The results clearly indicate that IgG did not diffuse into the beads and consequently, its breakthrough capacity is low. This is in accordance with the results presented in Table 1 showing that dextrans with molecular weights exceeding 126 000 g/mol exhibit $K_{av}$-values lower than 0.021. The results also indicated that host cell proteins with molecular weights less than approximately 44000 g/mol will be captured by the ligands in the core of the beads.

Two prototypes (Q2 and Q3) based on Spinning Disc prototype D and E (Table 1), respectively, were also tested. Both prototypes were modified with Q-groups in the core of the beads according to FIG. 2 (see the synthesis section for more details).

TABLE 3

Breakthrough capacity ($Q_{b10\%}$) for three proteins on anion exchange prototypes Q2 and Q3 design as depicted in FIG. 2 and based on Spinning Disc prototype D and E, respectively.

| Protein | Molecular weight (g/mol) | $Q_{b10\%}$ of Q2 (mg/mL) | $Q_{b10\%}$ of Q3 (mg/mL) |
|---|---|---|---|
| IgG | 150 000 | 2.1 | 2.3 |
| BSA | 68 000 | 3.9 | 8.8 |
| Ovalbumin | 43500 | 41.2 | 58.1 |

Even these prototypes excluded IgG and showed high breakthrough capacities for ovalbumin. It was also evident that a relatively high capacity (8.8 mg/mL) was obtained for the anion exchanger based on Spinning Disc prototype E. This is in accordance with the data presented in Table 1 showing that this disc prototype resulted in a higher $K_{av}$-value for dextran with a molecular weight of 66700 g/mol compared to prototype D. The results from prototype E show that BSA can diffuse into the beads and interact with the anion exchange ligand. Therefore, new anion exchangers including optimized ligand constructions to obtain higher BSA breakthrough capacities were produced (see below).

Example 6

Breakthrough Capacity for Weak Anion Exchange Prototypes

The ligand (DEAE) was attached to the matrix via an extender by coupling DEAE-dextran to the interior of the beads. In this case, dextran is the extender and DEAE (diethylaminoethyl) is the ligand. Three prototypes (Table 4) where DEAE-dextran was coupled to the interior of the beads (see the synthesis section for more details) were produced and all prototypes were equipped with OH-lid as depicted in FIG. 3.

TABLE 4

Ligand density (measured as Cl$^-$-capacity) for the three DEAE prototypes.

| DEAE-Prototype | Ligand density (μmol/mL) |
|---|---|
| DEAE-I | 11 |
| DEAE-II | 62 |
| DEAE-III | 190 |

According to Table 5 all prototypes yielded very good results. For the best prototype (DEAE-III) the breakthrough capacities of IgG, BSA and ovalbumin were 0.9, 181, >190 mg/mL, respectively. The results presented in Table 5 are excellent and also indicate that even larger proteins than BSA will have high breakthrough capacities while the breakthrough capacity for IgG is lower than 2 mg/mL.

TABLE 5

Breakthrough capacities ($Q_{b10\%}$) for three proteins on the anion exchange prototypes DEAE-I, DEAE-II and DEAE-III design as depicted in FIG. 3 and based on Spinning Disc prototype E.

| Protein | $Q_{b10}$ of DEAE-I (mg/mL) | $Q_{b10}$ of DEAE-II (mg/mL) | $Q_{b10}$ of DEAE-III (mg/mL) |
|---|---|---|---|
| IgG | 1.5 | 1.2 | 0.9 |
| BSA | 90 | 115 | 181 |
| Ovalbumine | 15.5 | 108 | >190 |

Example 7

Breakthrough Capacity for Cation Exchange Prototype

Prototype COO$^-$

A prototype (prototype COO$^-$) including a high salt ligand (see the synthesis section) in the core of the beads (Spinning Disc prototype A, Table 1) was tested. The breakthrough capacity was investigated for IgG and ovalbumin and the mobile phase was acetate buffer (pH 4.0) with addition of salt (0.15 M NaCl). The salt was added to verify that a high breakthrough capacity also could be obtained at relatively high ionic strengths for ovalbumin The capacity for IgG was recorded to 1.7 mg/mL and for ovalbumin to approximately 39 mg/mL. The high salt ligand in the core of the beads adsorbed ovalbumin as expected and a relatively high capacity was observed. Furthermore, the breakthrough capacity for IgG was low as expected.

While preferred illustrative embodiments of the present invention are described, one skilled in the art will appreciate that the present invention can be practiced by other than the described embodiments, which are presented for purposes of illustration only and not by way of limitation. The present invention is limited only by the claims that follow.

The invention claimed is:

1. A method for selective production of polymer beads in a Spinning Disc procedure, wherein the beads have a porosity that prevents molecules larger than 150 000 g/mol to diffuse into the beads, comprising the following steps:
   a) feeding a 4-8% polysaccharide solution, which has a viscosity within 350-450 mPas, at 65-75° C. to one or more spinning discs at 3001-3010 rpm to form polysaccharide beads; and
   b) capturing said formed polysaccharide beads in a capturing bath; wherein the porosity of the polysaccharide beads is controlled by varying the temperature of the capturing between 15 and 27° C., preferably between 17.5 and 24.6° C.

2. The method of claim 1, wherein the polysaccharide is selected from the group consisting of agarose, carrageenan, dextran, alginate, pectin, starch and galactomannans.

3. The method of claim 2, wherein the polysaccharide beads in step a) is a 6% agarose solution at approximately 70° C., and, with a viscosity of 397-421 mPas.

4. The method of claim 1, wherein the feeding of said polysaccharide solution in step a) to said one or more Spinning Discs is at a flow rate of 120-170 mL/min.

5. The method of claim 1, wherein the polysaccharide beads are cross-linked after step b).

6. The method of claim 5, wherein the polysaccharide beads are also provided with lids or outer layers after step b).

7. The method of claim 6, wherein the polysaccharide beads are allylated and partially brominated and NaOH treated to form a lid on the core polysaccharide beads.

8. The method of claim 6, wherein the core polysaccharide beads are provided with ligands, such as ion exchange ligands.

9. The method of claim 8, wherein the polysaccharide beads are agarose beads and the ion exchange ligands are weak anion exchange ligands provided with extenders.

\* \* \* \* \*